Oct. 19, 1937. M. HEINRICH Re. 20,534

GRAPHIC PAPER

Original Filed July 10, 1931

Inventor:

Max Heinrich

Reissued Oct. 19, 1937 Re. 20,534

UNITED STATES PATENT OFFICE 20,534

GRAPHIC PAPER

Max Heinrich, Berlin-Pankow, Germany, assignor to Firm Graf und Co., Verpackungs-Maschinen, Berlin, Germany Original No. 1,917,032, dated July 4, 1933, Serial No. 549,866, July 10, 1931, and in Germany July 12, 1930. Application for reissue January 20, 1934, Serial No. 707,616

11 Claims. (Cl. 95—8)

This invention relates to graphic paper, this term being used in a broad sense to indicate paper of the type commonly referred to as photographic paper on which drawings and images are produced or reproduced photographically, and paper of the class commonly referred to as drawing paper on which drawings are made by draftsmen and artists in pencil and ink and the like. The invention relates more particularly to photographic paper such as is used for making blue prints or similar photographic reproductions, and to drawing paper of the kind customarily used for making construction or shop drawings. The object of the invention is to provide such graphic papers with a backing of metal foil arranged in a novel form to permit its use regardless of the dimensions of the paper, and to reduce the possibility of puncturing the paper to a minimum when making pencil or ink tracings therefrom. Other more specific objects will appear from the description hereinafter and the features of novelty will be pointed out in the claims.

Figure 1:
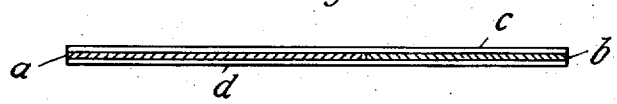
Figure 3:
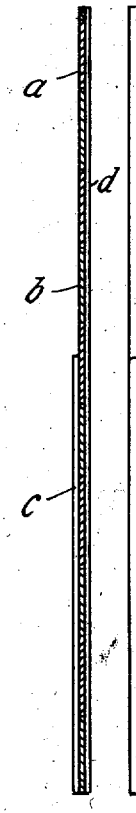
Figure 2:
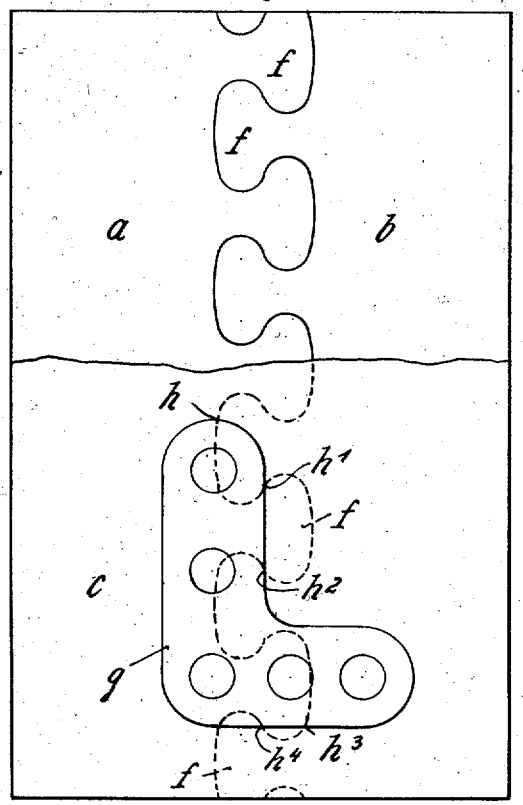

In the accompanying drawing, which illustrates an example of the invention without defining its limits, Fig. 1 is a cross-sectional view of the novel graphic paper in one form; Fig. 2 is a face view thereof with parts broken away, and Fig. 3 is a longitudinal section through Fig. 2.

The graphic paper, in the form illustrated, consists of an outer sheet *c*, a backing of metal foil *a*—*b* secured to the one surface of said sheet *c*, and an outer sheet *d* fastened to the rear surface of said backing of metal foil *a*—*b*, as shown in Fig. 1. When constructed in the indicated manner the sheet *c* constitutes photographic paper of the type exemplified by the customary blue print paper or the like, while the backing of metal foil *a*—*b* is constructed of aluminum; in such case the outer sheet *d* constitutes a protective layer or sheet which serves to protect the aluminum foil backing *a*—*b* against decomposition if the photographic print is developed by means of an acid or salt. If this protection is not required the protecting sheet *d* may be omitted, in which case, the graphic paper will simply consist of the sheet *c* of photographic paper and the backing of metal foil *a*—*b*. The latter may be applied to the sheets *c* and *d* by a process of hard rolling and in some forms the sheet *d* may be secured to said metal backing *a*—*b* by means of a suitable paste.

In some forms of the graphic paper the outer sheet *d* may be a sheet of drawing paper to one surface of which the backing of metal foil *a*—*b* may be fastened in any convenient manner as by pasting. In such case the sheet *c* may be omitted or included as part of the graphic paper in a form other than photographic paper. If the sheet *d* constitutes a sheet of drawing paper, drawings may be made thereon in any customary manner by means of pencil and drawing ink and erasures may be made thereon in the usual way.

As aluminum at a thickness of 0.04 mm. can be conveniently rolled only in widths of from 50–60 cm., it would be difficult, if not impossible, to make the novel graphic paper in dimensions exceeding the indicated widths unless special provision such as hereinafter set forth is made to make this possible. The backing of metal foil, in the novel paper, accordingly consists of a plurality of adjacent sections as exemplified by the sections *a*—*b* of the illustrated example. To provide the most efficient arrangement of such sections of metal foil and to reduce the danger of injury when the paper is folded and the possibility of puncturing the paper in the making of tracings therefrom, the sections of metal foil *a*—*b* have their contiguous edges in engagement with each other along a line other than a line continuously straight throughout the length of said contiguous edges. In the illustrated form shown in Fig. 2 of the drawing, the abutting edges of the sections *a* and *b* are of undulating conformation or more specifically of wave-shaped or dovetail form as shown in *f*; in other words, the aforesaid contiguous edges of the sections *a* and *b* lie in engagement with each other along a line extending alternately to opposite sides of a median line throughout the length of said edges, it being understood that the specific conformation of the line along which the sections *a* and *b* engage each other in Fig. 2 may be varied in any way within the scope of the aforesaid terminology. More particularly said wave-shaped edges *f* may be in the form of sine-curves of any desired amplitude, that is to say, said edges are not necessarily of the specific serpentine shape shown in the drawing. When using edges *f* of the form of a sine or similar curve, the curve may also be more flattened or more pointed than as shown. The arrangement of metal backing as illustrated and described has the great advantage that it permits the backing to be applied efficiently to graphic paper of any dimensions, by placing a plurality of metal sheets or layers, which individually have a limited width, side by side with their wave-shaped edges *f* or their equivalent abutting; this also makes it possible to make drawing templets for work pieces of any desired size.

The undulating, wave-shape or equivalent edges *f* also reduce to a minimum the danger of perforating the paper when making a drawing thereon or a tracing therefrom and at the same time prevent breakage of the paper when the latter is folded, which perforation and breakage would be liable to occur if the adjacent edges of the backing sheets *a*—*b* engaged each other along a straight line.

Having the abutting edges of the two backing sheets *a* and *b* engaging each other along edges such as indicated at *f* or their equivalent, which edges abut each other, provides the further advantage that the surface of the paper will be plane and even, in contradistinction to arrangements in which the sheets exemplified by the sheets *a* and *b* overlap each other and thereby form ridges at the overlapping portions. It is quite evident that the lines of a drawing produced or reproduced on the novel graphic paper will intersect the edges of the sections *a* and *b* which abut each other along wave-shaped or equivalent lines, only at single points, while in the case of straight abutting edges or overlapping edges, the lines of such drawing will intersect the abutting line of the two sheets along a greater or even the entire length of the line of junction; in the latter instances if lines of the drawing happen to coincide or register with such straight line of junction, the pencil or other instrument used in making such lines might easily perforate the paper and result in injurying or tearing not only the paper sheet, but also the metal foil backing *a*—*b*.

The novel effect and the advantages which may be attained with the present invention may be clearly seen from Fig. 2 in which *g* designates a drawing of an angle-iron with holes, it being understood that this illustration is merely an example; the single points at which the lines of the drawing of this angle-iron *g* intersect the wave-shaped or equivalent line along which the adjacent edges of the sections *a* and *b* of the metal foil engage each other are indicated at $h$, $h'$, $h^2$, $h^3$, and $h^4$. It will be noted that the angles of intersection between the lines of the drawing *g* and the lines *f* along which the sections *a* and *b* engage each other are all approximately right angles with the result that during the process of copying, the drawing cannot be distorted by warping or the like.

As previously stated herein, the term "graphic" is used in a broad sense to indicate not only the production of drawings by lines and the like, but also the reproduction of images and their equivalent photographically.

Various changes in the specific forms shown and described may be made within the scope of the claims without departing from the spirit of the invention.

I claim:

1. As an article of manufacture, a sheet of graphic paper, and a backing of metal foil secured to one surface of said sheet of paper, said backing consisting of a plurality of adjacent sections having their contiguous edges in engagement with each other along a line extending alternately to opposite sides of a median line throughout the length of said contiguous edges.

2. As an article of manufacture, a sheet of drawing paper, and a backing of metal foil secured to one surface of said sheet of paper, said backing consisting of a plurality of adjacent sections having their contiguous edges in engagement with each other along a line extending alternately to opposite sides of a median line throughout the length of said contiguous edges.

3. As an article of manufacture, a sheet of drawing paper, and a backing of metal foil secured to one surface of said sheet of paper, said backing consisting of a plurality of adjacent sections having their contiguous edges in engagement with each other along an undulating line throughout the length of said contiguous edges.

4. As an article of manufacture, a sheet of photographic paper, and a backing of metal foil secured to one surface of said sheet of paper, said backing consisting of a plurality of adjacent sections having their contiguous edges in engagement with each other along a line extending alternately to opposite sides of a median line throughout the length of said contiguous edges.

5. As an article of manufacture, a sheet of photographic paper, and a backing of metal foil secured to one surface of said sheet of paper, said backing consisting of a plurality of adjacent sections having their contiguous edges in engagement with each other along an undulating line throughout the length of said contiguous edges.

6. As an article of manufacture, a sheet of opaque photographic paper, a backing of metal foil permanently secured to the rear surface of said sheet of photographic paper throughout its area, and a protective layer fastened to the rear surface of said backing of metal foil.

7. As an article of manufacture, a sheet of photographic paper, a backing of metal foil secured to the rear surface of said sheet of photographic paper, said backing of metal foil consisting of a plurality of sections having their contiguous edges in engagement with each other along a line extending alternately to opposite sides of a median line throughout the length of said contiguous edges, and a protective layer fastened to the rear surface of said backing of metal foil.

8. As an article of manufacture, a sheet of photographic paper, a backing of metal foil secured to the rear surface of said sheet of photographic paper, said backing of metal foil consisting of a plurality of sections having their contiguous edges in engagement with each other along an undulating line throughout the length of said contiguous edges, and a protective layer fastened to the rear surface of said backing of metal foil.

9. As an article of manufacture, a photographic printing paper, especially for making copies of drawings, said paper consisting of a light-sensitive sheet, a metal foil backing fastened to the rear surface of said light sensitive sheet, said metal foil backing being composed of several pieces placed side by side and abutting with each other along wave-shaped edges, and a sheet of paper fastened to the rear surface of said metal foil backing.

10. As an article of manufacture, a sheet of opaque photographic paper, a backing of metal foil permanently secured to the rear surface of said sheet of photographic paper throughout its area, said backing of metal foil consisting of a plurality of sections having their contiguous edges in engagement with each other throughout the length of said contiguous edges along a line proceeding alternately from points on opposite sides of a line continuously straight, and a protective layer fastened to the rear surface of said backing of metal foil.

11. As an article of manufacture, a sheet of opaque graphic paper, a backing of metal foil permanently secured to the rear surface of said sheet of graphic paper throughout its area, and a protective sheet of paper permanently secured to the rear surface of said backing of metal foil throughout its area to form a three layer paper which remains flat regardless of temperature or moisture conditions, said sheet of opaque graphic paper being light sensitized.

MAX HEINRICH.